United States Patent [19]

Frykhult

[11] 4,374,729
[45] Feb. 22, 1983

[54] STRAINER DRUM FOR PULP AND THE LIKE

[75] Inventor: Rune H. Frykhult, Huddinge, Sweden

[73] Assignee: AB Celleco, Stockholm, Sweden

[21] Appl. No.: 228,543

[22] Filed: Jan. 26, 1981

[30] Foreign Application Priority Data

Jan. 24, 1980 [SE] Sweden .................. 8000563

[51] Int. Cl.³ ............................. B01D 33/06
[52] U.S. Cl. .................. 210/232; 210/402; 162/357
[58] Field of Search .......... 210/402, 404, 326, 232; 162/357

[56] References Cited

U.S. PATENT DOCUMENTS 2,669,910  2/1954  Trotman ............... 210/402 X
3,681,239  8/1972  Angelinetta ............ 210/402

Primary Examiner—Thomas G. Wyse
Attorney, Agent, or Firm—Cyrus S. Hapgood

[57] ABSTRACT

A strainer drum for straining pulp and the like comprises a substantially circular cylindrical mantle formed by a number of strainer elements provided with strainer openings, which strainer elements are held together between at least two gables to form the mantle.

7 Claims, 7 Drawing Figures

STRAINER DRUM FOR PULP AND THE LIKE

THE DISCLOSURE

This invention relates to a strainer drum for straining pulp and the like and comprising a substantially circular cylindrical mantle, formed by a number of strainer elements, provided with strainer openings.

Strainer drums are common in the pulp and paper industry. They are manufactured either as a mantle surface welded from steel, in most cases provided with drilled holes, or as a structure to which mantle plates are attached. It would be desirable to be able to design the strainer openings with a rather complicated transverse section in relation to the longitudinal axis of the strainer drum, with a view to strainer efficiency. It would be possible to achieve such a design in existing strainer drums, but the cost would be unacceptably high. There is an overall demand for the design of strainer drums which can be manufactured cheaply.

The principal object of the present invention is to provide a strainer drum of the type mentioned above which can have strainer openings of any desired type and which is of a cheap, simple design.

According to the invention, such a strainer drum is characterized in that the strainer elements are held together between at least two gables to form a mantle.

The strainer drum may be held together by a number of long bolts. In one advantageous embodiment of the new strainer drum there are provided, in opposing surfaces of the strainer elements, recesses for receiving rings connecting the strainer elements mutually and located in planes transverse to the longitudinal axis of the strainer drum. These recesses can be arranged in such a way that each ring is enclosed completely by strainer elements, or so that the ring extends only partly between the strainer elements and projects radially from either the outer or the inner annular surface of the drum.

In a further advantageous embodiment of the new strainer drum, the strainer elements, as seen in a transverse section perpendicular to the longitudinal axis of the strainer drum, are provided with protrusions and recesses complementing each other and directed in the circumferential direction to prevent radial movements of the strainer elements.

It is also suitable to provide the strainer elements, as seen in a plane through the longitudinal axis of the strainer drum, with axial recesses and protrusions complementing each other to prevent radial movements of the strainer elements.

The above-mentioned recesses and protrusions can be designed in different ways. For example, they can be in the form of knurled contact surfaces.

If the strainer elements are manufactured by injection molding of plastic, there is provided a great freedom in the design of the strainer openings and in the whole design of the strainer elements, and there is also an economical advantage gained in cheap manufacture. Such a suitable design of the strainer elements means that they can be provided with inner and/or outer peripheral protruding reinforcements which in effect form combs.

The invention will now be described more in detail, reference being made to the accompanying drawings in which.

Figure 1:
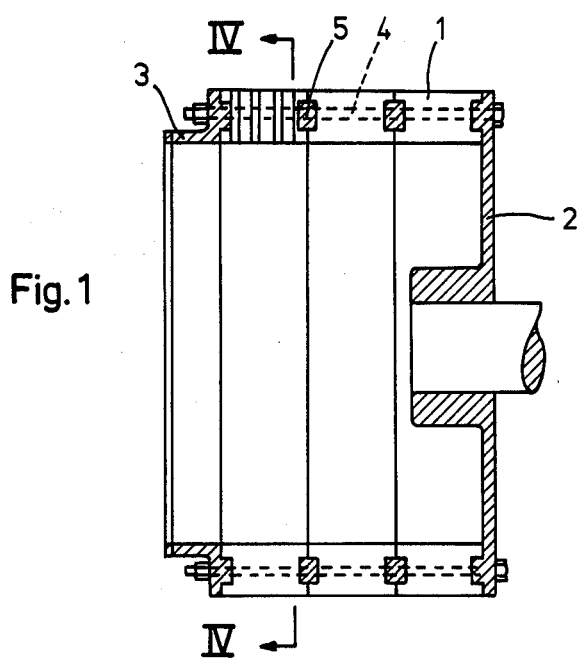
FIG. 1 is a longitudinal sectional view through a strainer drum according to the invention.
Figure 5:
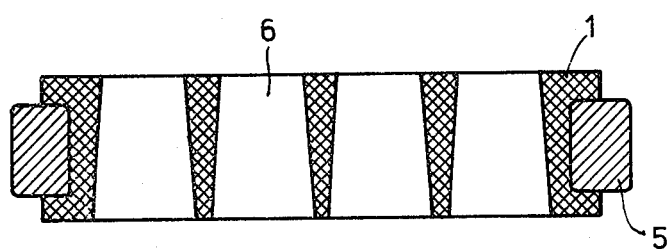
FIG. 5 is an enlarged longitudinal sectional view through a strainer element in the strainer drum of FIG. 1.

The strainer drum of FIG. 1 is built up from strainer elements 1 held together between two gables 2 and 3 by long bolts 4. The strainer elements 1 are provided in opposing surfaces with recesses in which are arranged rings 5 for stabilizing the mantle. One strainer element 1 with rings 5 is shown in FIG. 5, which also shows strainer openings 6.

Figure 2:
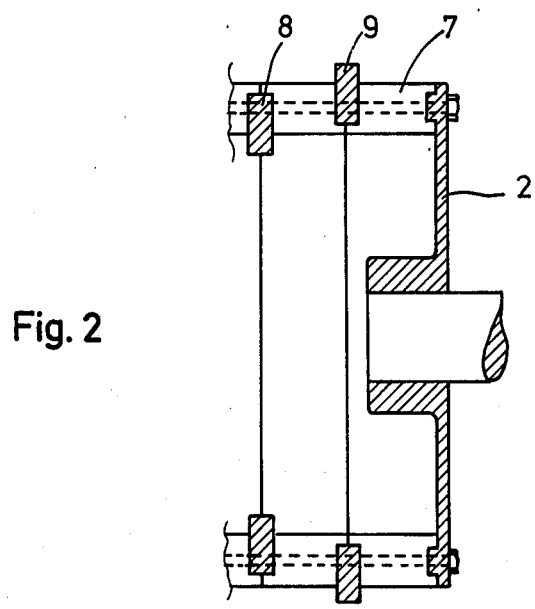
FIG. 2 is a longitudinal sectional view through part of another embodiment of a strainer drum according to the invention.

The strainer drum in FIG. 2 is built up from strainer elements 7, which are provided with radial inner and outer recesses in which are arranged inner rings 8 and outer rings 9 with a function similar to that of ring 5.

Figure 3:
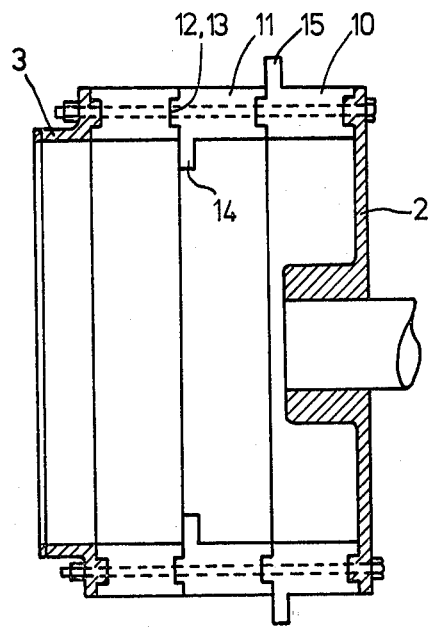
FIG. 3 is a longitudinal sectional view through a further embodiment of a strainer drum according to the invention.

The strainer drum in FIG. 3 is built up from strainer elements 10 and 11 provided partly with recesses and protrusions 12 and 13 complementing each other and partly with peripheral protruding inner and outer reinforcings 14 and 15, respectively.

Figure 4:
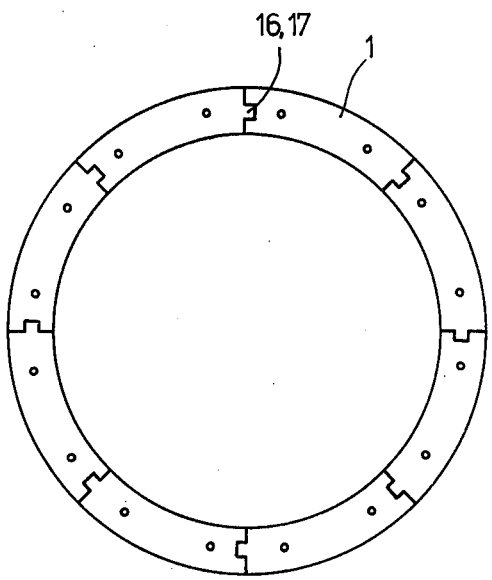
FIG. 4 is a transverse sectional view along line IV—IV in FIG. 1.

As shown in FIG. 4, each strainer element 1 is provided with recesses 16 and protrusions 17 which complement each other and are directed in the circumferential direction to prevent radial movements of the strainer elements.

Figure 6:
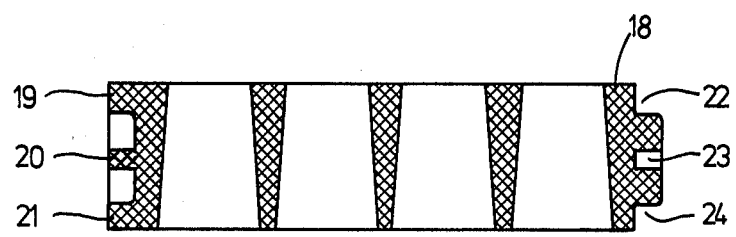
FIG. 6 is a view similar to FIG. 5 but showing a modified strainer element provided with axial protrusions and recesses.
Figure 7:
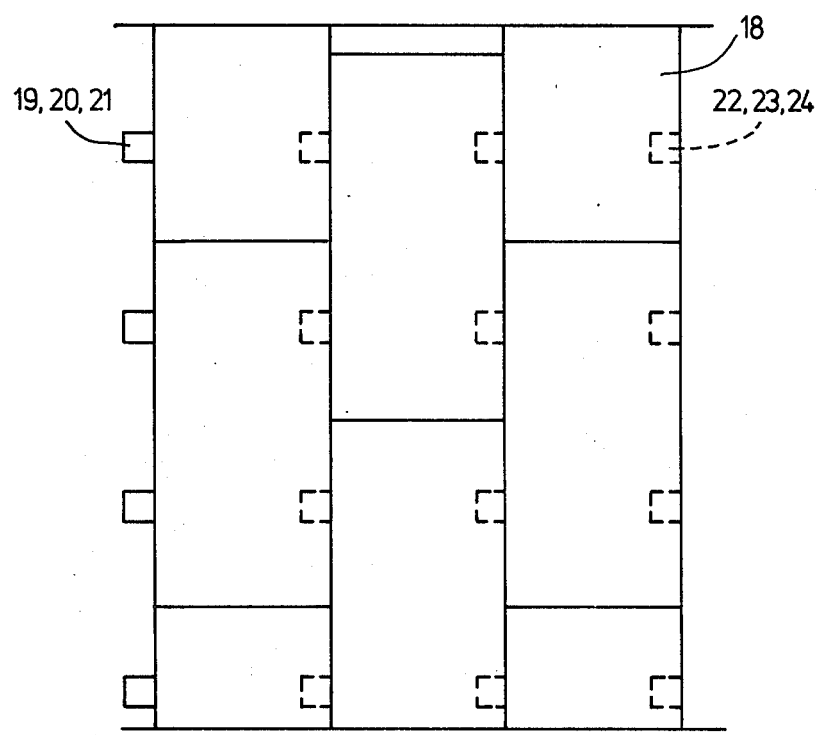
FIG. 7 shows schematically a developed mantle surface formed from strainer elements according to FIG. 6.

An example of a design of axial protrusions and recesses of a strainer element 18 is shown in FIG. 6. The strainer element 18 is provided with protrusions 19, 20, 21 and corresponding recesses 22, 23, 24. A strainer drum built up from such strainer elements 18 is shown schematically in development in FIG. 7.

All strainer elements shown are manufactured from plastic, which means that there is provided a great freedom in design of the strainer as a whole and of the strainer openings.

I claim:

1. A strainer drum for straining pulp and the like, comprising a substantially circular cylindrical mantle having a longitudinal axis and formed by strainer elements provided with strainer openings, a pair of gables forming opposite ends of the drum and between which the strainer elements are held together to form said mantle, said elements having inter-abutting edges to form a circular series of said elements as viewed in a plane transverse to said axis, there being a plurality of said circular series interposed between said gables, first means releasably interlocking said abutting edges in each circular series to prevent radial movement of said elements, each pair of adjacent circular series having interengaging surfaces, and second means releasably interlocking said interengaging surfaces to interconnect the strainer elements of each circular series in said adjacent pair.

2. The strainer drum of claim 1, in which the strainer elements have peripheral reinforcements protruding inwardly toward the longitudinal axis of the drum.

3. The strainer drum of claim 1, in which the strainer elements have peripheral reinforcements protruding outwardly from the drum.

4. The strainer drum of claim 1, in which said first interlocking means include a protrusion located on one of said abutting edges and received in a recess in the other abutting edge.

5. The strainer drum of claim 1, in which said second interlocking means include a ring located in a recess in each of said interengaging surfaces, said ring lying in a plane transverse to said longitudinal axis.

6. The strainer drum of claim 1, in which said second interlocking means include a protrusion on one of said interengaging surfaces and located in a recess in the other interengaging surface.

7. The strainer of claim 1, in which said gables constitute the sole support for the strainer elements.

* * * * *